United States Patent Office 3,592,905
Patented July 13, 1971

3,592,905
THERAPEUTIC METHODS
Tsung-Ying Shen, Westfield, Conrad P. Dorn, Jr., Plainfield, Robert L. Bugianesi, Colonia, and Leonard E. Olen, Clark, N.J., assignors to Merck & Co., Inc., Rahway, N.J.
No Drawing. Filed Oct. 3, 1969, Ser. No. 872,733
Int. Cl. A61k 27/00
U.S. Cl. 424—270
2 Claims

ABSTRACT OF THE DISCLOSURE

Anti-inflammatory compositions containing a thiazolidine-4-carboxylic acid, ester or amide as an active ingredient.

---

This invention relates to a method of treating inflammation in patients (animal or human) utilizing novel anti-inflammatory compositions containing a thiazolidine-4-carboxylic acid, ester or amide. More particularly, this invention relates to the use of thiazolidine-4-carboxylic acids as the active therapeutic ingredient in the herein described methods and compositions.

Accordingly, it is an object of this invention to provide a method of treatment of inflammation. Another object of this invention is to provide a new class of anti-inflammatory compositions.

The above and other objects of this invention are accomplished by treatment of a disease condition symptomatically evidenced by inflammation, which comprises the administration in dosage unit form of a pharmaceutically acceptable composition containing a therapeutically effective amount of a thiazolidine-4-carboxylic acid, ester, or amide. The thiazolidine-4-carboxylic acids, esters and amides of this invention can be represented by the following formula:

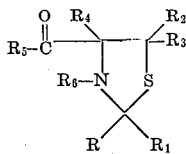

wherein R, $R_1$, $R_2$, $R_3$, $R_4$ and $R_6$ may each be hydrogen, loweralkyl (methyl, ethyl, propyl, butyl, t-butyl, etc.); loweralkenyl (vinyl, allyl, propenyl, crotyl, etc.); loweralkynyl (ethynyl, propargyl, etc.), cycloalkyl (cyclopropyl, cyclobutyl, cyclopentyl, cyclohexyl, cycloheptyl, cyclooctyl, etc.); aryl (phenyl, naphthyl, benzyl); substituted aryl (p-chlorophenyl, p-methylphenyl, m, p or o-aminobenzyl, etc.); heteroaryl (thienyl, furyl, pyrrolyl, imidazolyl, pyridyl, oxazolyl, thiazolyl, pyrimidinyl); or substituted heteroaryl and $R_5$ may be hydroxy, loweralkoxy (methoxy, ethoxy, propoxy, butoxy, etc.), amino, loweralkylamino (methylamino, ethylamino, propylamino, etc.), diloweralkylamino (dimethylamino, diethylamino, methylethylamino, etc.) or diloweralkylaminoloweralkyl (dimethylaminomethyl, diethylaminomethyl, diethylaminoethyl, etc.).

The compounds useful in the compositions of this invention may be prepared by the prior art methods disclosed in Chapter 25 of the Chemistry of Penicillin, Princeton University Press, 1949. The acid compounds of this invention may be prepared by condensing the appropriate cysteine or penicillamine derivative with aldehydes or ketones in a wide variety of solvents including water, alcohol and acetic acid. Thiazolidines may also be obtained under anhydrous conditions.

When the esters of cysteine or penicillamine are used in place of the free acids the corresponding thiazolidine-4-carboxylic esters are obtained. Likewise, the use of acid amide derivatives of cysteine or penicillamine gives the corresponding thiazolidine-4-carboxylic acid amide. These latter compounds may also be prepared from the ester by treatment with the appropriate amine.

N-alkyl compounds may be prepared by treatment of the thiazolidine-4-carboxylic acid with a suitable halide (alkyl, alkenyl, etc.) in liquid ammonia. N-acyl compounds can be made in the usual manner by treating the parent thiazolidine with the appropriate acyl halide.

A preferred embodiment of this invention is a method of treating a disease which is symptomatically characterized by inflammation which comprises the administration in dosage unit form to a host of 0.01 to 5 g. of a thiazolidine-4-carboxylic acid per day. On a kilogram basis it is preferred to utilize 0.5 mg./kg. to 70 mg./kg. per day of the thiazolidine-4-carboxylic acid compound of this invention. Another embodiment of this invention is the provision of pharmaceutical compositions in dosage unit form which comprise from about 5 to 500 mg., and preferably from 25 to 250 mg., of a thiazolidine-4-carboxylic acid compound of the above formula. 2-(2-thienyl)-L-thiazolidine-4-carboxylic acid, 2-cyclooctylthiazolidine-4-carboxylic acid, and the corresponding esters and amides in dosage unit form are the preferred pharmaceutical compositions of this invention.

The pharmaceutical compositions may be in a form suitable for oral use, for example, as tablets, aqueous or oily suspensions, dispersible powders or granules, emulsions, hard or soft capsules, or syrups or elixirs. Composition intended for oral use may be prepared according to any method known to the art for the manufacture of pharmaceutical compositions and such compositions may contain one or more agents selected from the group consisting of sweetening agents, flavoring agents, coloring agents and preserving agents in order to provide a pharmaceutically elegant and palatable preparation. Tablets contain the active thiazolidine-4-carboxylic acid ingredient in admixture with non-toxic pharmaceutically acceptable excipients which are suitable for manufacture of tablets. These excipients may be, for example, inert diluents, for example calcium carbonate, sodium carbonate, lactose, calcium phosphate or sodium phosphate; granulating and disintegrating agents, for example maize starch, or alginic acid; binding agents, for example starch, gelatine or acacia, and lubricating agents, for example magnesium stearate, stearic acid or talc. The tablets may be uncoated or they may be coated by known techniques to delay disintegration and absorption in the gastrointestinal tract and thereby provide a sustained action over a longer period.

Formulations for oral use may also be presented as hard gelatin capsules wherein the active ingredient is mixed with an inert solid diluent, for example calcium carbonate, calcium phosphate or kaolin, or as soft gelatine capsules wherein the active ingredient is mixed with an oil medium, for example arachis oil, liquid paraffin or olive oil.

Aqueous suspensions contain the active thiazolidine-4-carboxylic acids, esters or amides in admixture with excipient suitable for the manufacture of aqueous suspensions. Such excipients are suspending agents, for example sodium carboxymethylcellulose, methylcellulose, hydroxypropylmethylcellulose, sodium alginate, polyvinylvyrrolidone, gum tragacanth and gum acacia; dispersing or wetting agents may be a naturally-occurring phosphatide, for example lecithin, or condensation products of an alkylene oxide with fatty acids, for example polyoxyethylene stearate, or condensation products of ethylene oxide with long chain aliphatic alcohols, for example heptadecaethyleneoxy-cetanol, or condensation products of ethylene oxide with partial esters derived from fatty acids and a hexitol, for example polyoxyethylene sorbitol mono-oleate, or condensation products of ethylene oxide with partial esters derived from fatty acids and hexitol anhydrides, for example polyoxyethylene sorbitan mono-oleate. The said aqueous suspensions may also contain one or more preservatives, for example ethyl, or n-propyl, p-hydroxy benzoate, one or more coloring agents, one or more flavoring agents and one or more sweetening agents, such as sucrose, saccharin, or sodium or calcium cyclamate.

Oily suspensions may be formulated by suspending the active ingredient in a vegetable oil, for example arachis oil, olive oil, sesame oil or coconut oil, or in a mineral oil such as liquid paraffin. The oily suspensions may contain a thickening agent, for example beeswax, hard paraffin or cetyl alcohol. Sweetening agents, such as those set forth above, and flavoring agents may be added to provide a palatable oral preparation. These compositions may be preserved by the addition of an anti-oxidant such as ascorbic acid.

Dispersible powders and granules suitable for preparation of an aqueous suspension by the addition of water provide the active ingredient in admixture with a dispersing or wetting agent, suspending agent and one or more preservatives. Suitable dispersing or wetting agents and suspending agents are exemplified by those already mentioned above. Additional excipients, for example sweetening, flavoring and coloring agents, may also be present.

The pharmaceutical compositions of this invention may also be in the form of oil-in-water emulsions. The oily phase may be a vegetable oil, for example olive oil or arachis oils, or a mineral oil, for example liquid paraffin or mixtures of these. Suitable emulsifying agents may be naturally-occurring gums, for example gum acacia or gum tragacanth, naturally-occurring phosphatides, for example soya bean lecithin, and esters of partial esters derived from fatty acids and hexitol anhydrides, for example sorbitan mono-oleate, and condensation products of the said partial esters with ethylene oxide, for example polyoxyethylene sorbitan mono-oleate. The emulsions may also contain sweetening and flavoring agents.

Syrups and elixirs may be formulated with sweetening agents, for example glycerol, sorbitol or sucrose. Such formulations may also contain a demulcent, a preservative and flavoring and coloring agents. The pharmaceutical compositions may be in the form of a sterile injectable preparation, for example as a sterile injectable aqueous suspension. This suspension may be formulated according to the known art using those suitable dispersing or wetting agents and suspending agents which have been mentioned above. The sterile injectable preparation may also be a sterile injectable solution or suspension in a nontoxic parenterally-acceptable diluent or solvent, for example as a solution in 1:3-butane diol.

The thiazolidine-4-carboxylic acid compositions of this invention may also be in the form of suppositories for rectal administration of the drug. These compositions can be prepared by mixing the drug with a suitable non-irritating excipient which is solid at ordinary temperatures but liquid at the rectal temperature and will therefore melt in the rectum to release the drug. Such materials are cocoa butter and polyethylene glycols. Gels and creams may also be prepared in conventional manners for topical administration.

The pharmaceutical compositions may be tableted or otherwise formulated so that for every 100 parts by weight of the composition there are present between 5 and 95 parts by weight of the active ingredient and preferably between 25 and 85 parts by weight of the active ingredient. The dosage unit form will generally contain between about 25 mg. and about 250 mg. of the active ingredient of the formula stated above.

From the foregoing formulation discussion it is apparent that the compositions of this invention can be administered orally, parenterally, topically and rectally. The term parenteral as used herein includes subcutaneous injection, intravenous, intramuscular, or intrasternal injection or infusion techniques.

The dosage regimen in carrying out the methods of this invention is that which insures maximum therapeutic response until improvement is obtained and thereafter is the minimum effective level which gives relief. Thus, in general, the dosages are those that are therapeutically effective in the treatment of inflammation, pain and fever. In general, the daily dose can be between about 0.5 mg./kg. and 70 mg./kg., bearing in mind, of course, that in selecting the appropriate dosage in any specific case, consideration must be given to the patient's weight, general health, age and other factors which may influence response to the drug.

It is expected that the thiazolidine-4-carboxylic acid compositions of this invention will generally be administered in dosage units of between 5 and 500 mg. of active ingredient. Preferred compositions for ease of administration are in oral dosage unit form, e.g. tablets or capsules, containing between 25 and 250 mg. of a thiazolidine-4-carboxylic acid of this invention.

This invention is further demonstrated by the following examples in which all parts are by weight.

EXAMPLE 1

(A) A mixture of 250 parts of 2-(2-thienyl)-L-thiazolidine-4-carboxylic acid and 25 parts of lactose is granulated with suitable water and to this is added 100 parts of maize starch. The mass is passed through a 16-mesh screen. The granules are dried at a temperature below 60° C. The dry granules are passed through a 16-mesh screen and mixed with 3.8 parts of magnesium stearate. They are then compressed into tablets suitable for oral administration as an anti-inflammatory, according to the method of this invention.

(B) Methyl 2-(2-thienyl)-L-thiazolidine-4-carboxylate may be formulated into tablets according to the procedure of part (A).

(C) 2-(2-thienyl)-L-thiazolidine-4-carboxamide may be formulated into tablets suitable for oral administration according to the procedure of part (A).

EXAMPLE 2

A mixture of 50 parts of 2-cyclooctylthiazolidine-4-carboxylic acid, 3 parts of the calcium salt of lignin sulfonic acid, and 237 parts of water is ball-milled until the size of substantially all of the particles of 2-cyclooctylthiazolidine-4-carboxylic acid is less than 10 microns. The suspension is diluted with a solution containing 3 parts of sodium carboxymethylcellulose and 0.9 part of the butyl ester of p-hydroxybenzoic acid in 300 parts of water. There is thus obtained an aqueous suspension suitable for oral administration for therapeutic purposes.

EXAMPLE 3

A mixture of 250 parts of ethyl-2-(2-thienyl)-L-thiazolidine-4-carboxylate, 200 parts of maize starch and 30 parts of alginic acid is mixed with a sufficient quantity of a 10% aqueous paste of maize starch and granulated. The granules are dried in a current of warm air and the dry granules are then passed through a 16-mesh screen, mixed with 6 parts of magnesium stearate and compressed into tablet form to obtain tablets suitable for oral administration.

EXAMPLE 4

A mixture of 500 parts of 2-cyclooctylthiazolidine-4-carboxamide, 60 parts of maize starch and 20 parts of gum acacia is granulated with a sufficient quantity of water. The mass is passed through a 12-mesh screen and the granules are dried in a current of warm air. The dry granules are passed through a 16-mesh screen, mixed with 5 parts of magnesium stearate and compressed into tablet form suitable for oral administration.

Further illustrative of the preferred thiazolidine-4-carboxylic acid compounds of this invention are:

2,2-dimethylthiazolidine-4-carboxylic acid,
2,2,5,5-tetramethylthiazolidine-4-carboxylic acid,
3-ethylthiazolidine-4-carboxylic acid,
2-vinylthiazolidine-4-carboxylic acid,
5-ethynylthiazolidine-4-carboxylic acid,
2-p-chlorophenylthiazolidine-4-carboxylic acid,
5-naphthylthiazolidine-4-carboxylic acid, and
2-pyrrolylthiazolidine-4-carboxylic acid.

What is claimed is:

1. A method of treating inflammation which comprises orally administering to a host from about 0.5 mg./kg. to about 70 mg./kg. per day of a compound of the formula

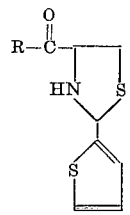

wherein R is hydroxy, loweralkoxy or amino.

2. The method as in claim 1 wherein the compound is 2-(2-thienyl)-L-thiazolidine-4-carboxylic acid.

References Cited

Chem. Abst. 42, 5453i (1948).

STANLEY J. FRIEDMAN, Primary Examiner

U.S. Cl. X.R.

424—251, 263